Aug. 9, 1932.  G. RIGANTE  1,871,345
COIL UNIT
Filed March 25, 1931
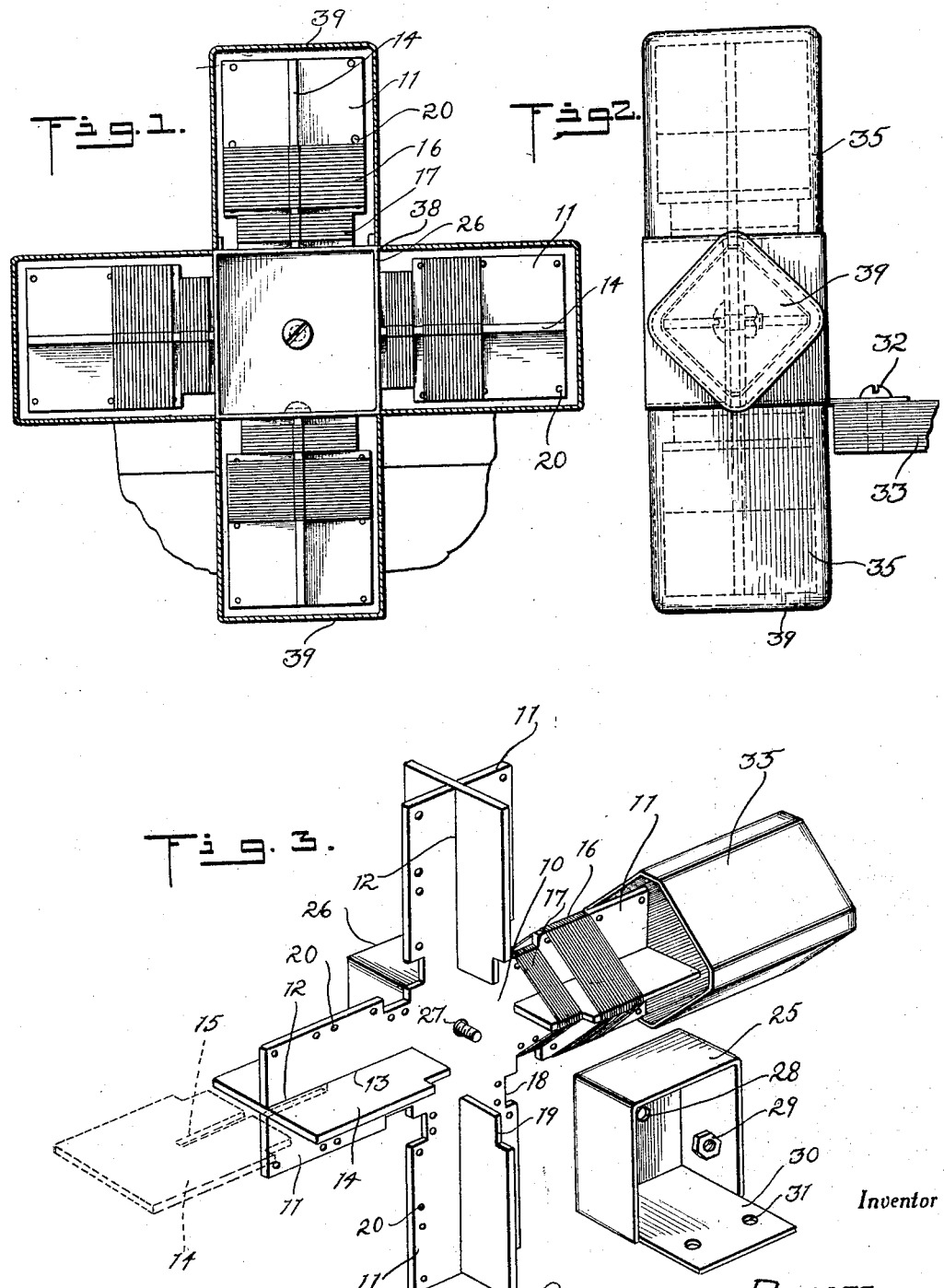
Inventor
GIUSEPPE RIGANTE
By Clarence A. O'Brien
Attorney Patented Aug. 9, 1932

1,871,345

UNITED STATES PATENT OFFICE

GIUSEPPE RIGANTE, OF WESTERLEIGH, STATEN ISLAND, NEW YORK

COIL UNIT

Application filed March 25, 1931. Serial No. 525,232.

The present invention relates to new and useful improvements in electrical devices, and more particularly it pertains to a new and novel coil unit especially adapted for use in radio apparatus.

It is one of the objects of the present invention to provide a coil unit in which a multiplicity of coils may be formed and mounted as a single unit and used in such a manner that interference or inductance between the coils will be eliminated.

It is a further object of the invention to provide a device of the aforementioned character about which a plurality of coils of any desired size or capacity within certain limits may be formed.

It is a still further object of the invention to provide a coil unit in which novel means for supporting the unit in operating position is provided.

Still a further object of the invention resides in a novel construction whereby each of the coil elements may be shielded from the remaining coil elements.

With the above and other objects in view which will become apparent as the nature of the invention is more clearly understood, reference will be had to the accompanying drawing, wherein;

Figure 1 is a view in front elevation of a coil unit constructed in accordance with the present invention, Figure 2 is a view in side elevation thereof, and;

Figure 3 is a perspective view showing the coil unit in partially disassembled position.

Referring more particularly to the drawing, the device comprises a coil support consisting of a body member 10 of cross-shaped form having arms 11. The body member 10 is formed of any suitable non-conducting material such as bakelite hard rubber or the like and it is of relatively thin dimension.

Each of the arms 11 is provided with a slot 12 which extends inwardly from its outer end for a substantial difference and it is the purpose of this slot to receive the slotted portion 13 of relatively thin members 14 of any suitable material which members 14 are slotted as indicated at 15 in Figure 3 the slot 15 being for interengagement with the slot 12 of the arms 11. This construction provides arms for the body member 10 which arms are of cross shape in cross sectional form.

The coils formed about these arms are conventionally shown at 16 and 17, and they may be of any size or capacity desired and it will be noted that the arms may have cut out or reduced portions 18 and the member 14 may be provided with similar reduced portions 19 around which relatively smaller coils may be formed and the arms 11 of the body member 10 may be provided with a plurality of openings 20 through which the terminal ends of the coils may be led it being noted that these openings 20 are provided in multiple along the edges of the arms 11.

Means is provided to support the coil unit in operative position and in the present embodiment of the invention, this means comprises two box like members 25 and 26 secured to opposite sides of the body member 10 by means of a bolt or the like 27 which passes through the body member 10 and openings 28 in the box like members 25 and which receives a suitable nut or the like 29. The box member 25 has one wall extended as at 30 and provided with a plurality of openings 31 for the reception of screws or the like 32 see Figure 2 by which the coil unit may be secured to a suitable support or the like 33.

Shielding means for the coil preferably in the form of housings or the like 35 are provided and these housings are adapted to slip over the ends of the arms 11 and have their open inner ends abut the side walls of the box like members 25 and 26 as designated at 38 in Figure 1, the outer ends of the shielding housings 35 being closed as at 39.

Thus it will be apparent that the present invention provides a coil unit in which a plurality of coils of various size and capacity may be carried by a single supporting element, may be shielded from each other, and may be supported in such a manner that interference or induction between the various coils is prevented.

While the invention has been herein disclosed in a preferred form, it is to be understood that the invention is not to be limited to the specific construction shown and that it may be practiced in other forms without departing from the spirit thereof.

Having thus described the invention, what is claimed as new and what it is desired to secure by Letters Patent of the United States, is:

1. A device of the character described comprising a relatively thin body member of cross-shaped form, and relatively thin rectangular members adjustably mounted thereon and positioned in a plane at right angles to the plane of the arms, and a box like member secured to said body portion on each of the opposite sides thereof, one of said box like members providing a supporting means for the body members.

2. A device of the character described comprising a relatively thin body member of cross-shaped form, and relatively thin rectangular members adjustably mounted thereon and positioned in a plane at right angles to the plane of the arms, and a box like member secured to said body portion on each of the opposite sides thereof, one of said box like members providing a supporting means for the body members, and both of said members serving as stops for limiting the inward movement of said relatively thin rectangular members.

3. A device of the character described, comprising a relatively thin body member of cross-shaped form, the arms of the cross having longitudinal slots extending inwardly from their outer ends, slotted members adapted for interengagement with the slots of the arms of the body member, and arranged at right angles thereto, box like members secured to opposite sides of the body portion, one of which forms supporting means for the device, coils formed on the arms of the body member, and shielding elements slidably mounted on the arms of the cross-shaped body member enclosing said coils, and having their inner ends abutting said box like members.

In testimony whereof I affix my signature.

GIUSEPPE RIGANTE.